United States Patent
Song et al.

(10) Patent No.: US 6,519,634 B1
(45) Date of Patent: Feb. 11, 2003

(54) METHOD OF GENERATING IEEE 1394 VIRTUAL NETWORK IN WHICH A VIRTUAL NETWORK CONTROLLER IS CONNECTED TO GENERATE SELF ID PACKETS AS VIRTUAL NODE ID

(75) Inventors: Jung-ho Song, Suwon (KR); Ki-won Lee, Suwon (KR); Dong-il Han, Suwon (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 09/385,468

(22) Filed: Aug. 30, 1999

(30) Foreign Application Priority Data

Oct. 13, 1998 (KR) .......................................... 98-42716

(51) Int. Cl.[7] .......................................... G06F 15/177
(52) U.S. Cl. ...................................... 709/220; 709/221
(58) Field of Search ................................ 709/220–222, 709/253, 229, 223; 710/104, 10; 370/338; 345/418

(56) References Cited

U.S. PATENT DOCUMENTS

| | | | | |
|---|---|---|---|---|
| 5,724,517 A | * | 3/1998 | Cook et al. ................. | 395/200 |
| 5,751,967 A | * | 5/1998 | Raab et al. ................. | 395/200 |
| 5,802,286 A | * | 9/1998 | Dere et al. ................. | 395/200 |
| 5,966,130 A | * | 10/1999 | Benman, Jr. ................ | 345/418 |
| 6,122,248 A | * | 9/2000 | Murakoshi et al. .......... | 370/216 |
| 6,157,972 A | * | 12/2000 | Newman et al. ............ | 710/100 |
| 6,185,622 B1 | * | 2/2001 | Sato ............................ | 709/233 |
| 6,327,637 B1 | * | 12/2001 | Chang ........................ | 710/100 |
| 6,445,690 B2 | * | 9/2002 | Sato et al. .................. | 370/338 |
| 6,445,691 B2 | * | 9/2002 | Sato ............................ | 370/338 |

FOREIGN PATENT DOCUMENTS

JP 9-331340 12/1987

OTHER PUBLICATIONS

Motohiko Inoda, "IEEE 1394 Standard Primer," First Edition, Gijutsu Hyoronsha ltd., Jun., 1998, pp. 89–98.

* cited by examiner

Primary Examiner—Meng-Al T. An
Assistant Examiner—Kenny Lin
(74) Attorney, Agent, or Firm—Sughrue Mion, PLLC

(57) ABSTRACT

A method of generating an IEEE 1394 virtual network in which a virtual network is constructed on the IEEE 1394 network and respective nodes sense the virtual network and a controller for generating the virtual network. The method steps of connecting a virtual network controller for generating a virtual self ID packet including a virtual node ID information required for constructing a virtual network to a predetermined IEEE 1394 network, the respective nodes and the virtual network controller constructing the IEEE 1394 network for determining whether they are branches or leaves by performing virtual bus initialization, determining parent ports and child ports with respect to the ports of the respective nodes and a root node by performing a virtual tree identification, and determining the physical node IDs of the respective nodes by sending the prepared virtual self ID packet.

3 Claims, 14 Drawing Sheets

A: DATA_PREFIX & SELF-ID PACKET & DATA_END

METHOD OF GENERATING IEEE 1394 VIRTUAL NETWORK IN WHICH A VIRTUAL NETWORK CONTROLLER IS CONNECTED TO GENERATE SELF ID PACKETS AS VIRTUAL NODE ID

BACKGROUND OF THE INVENTION

1. Field of the Invention

The present invention relates to an IEEE 1394 network, and more particularly, to a method of generating an IEEE 1394 virtual network in which a virtual network is constructed on the IEEE 1394 network and the respective nodes sense the virtual network, and a controller for generating the virtual network.

2. Description of the Related Art

In general, an IEEE 1394 network is comprised of at least two nodes in which each node has an intrinsic node identification "ID." Here, the IDs of the respective nodes are sequentially determined. Namely, when there are three nodes, the node IDs are determined to be 0, 1, and 2. When there are five nodes, the node IDs are determined to be 0, 1, 2, 3, and 4. Therefore, in order to let an arbitrary node ID represent a desired predetermined node, at least as many node IDs as nodes are necessary.

When different IEEE 1394 networks in which initializations are independently performed are connected to each other by a medium, the respective nodes constructing the networks sense these networks as those having different bus IDs. Namely, it is not currently possible to let the nodes sense the different IEEE 1394 networks as those having the same bus IDs.

SUMMARY OF THE INVENTION

To solve the above problem, it is an object of the present invention to provide a method of generating an IEEE 1394 virtual network in which it is possible to install an arbitrary node ID on a network and the respective nodes sense different IEEE 1394 networks connected by a predetermined medium as the same network.

It is another object of the present invention to provide a virtual network controller for controlling the generation of the IEEE 1394 virtual network.

Accordingly, to achieve the first object, there is provided a method for generating an IEEE 1394 virtual network. This method comprises the steps of: connecting a virtual network controller for generating a virtual self ID packet including virtual node ID information required for constructing a virtual network to a predetermined IEEE 1394 network; the respective nodes and the virtual network controller constructing the IEEE 1394 network; and for determining whether the respective nodes are branches or leaves (in this network) by performing virtual bus initialization; determining parent ports and child ports with respect to ports of the respective nodes and a root node by performing a virtual tree identification; and determining physical node IDs of the respective nodes by sending the prepared virtual self ID packet.

The virtual tree identification step comprises the steps of: setting the port of a leaf node as a parent node by the virtual network controller and the leaf node sending a parent_notify signal to a branch node; and the branch node transferring a child_notify signal to the virtual network controller and the leaf node; then setting itself as a child port and becoming a root node when the branch node receives the parent_notify signal.

The step of determining the physical node ID comprises the steps of: repeating and transferring as many self ID packets as virtual node IDs through at least one virtual network controller (VNC) connected to at least one port of a root node; and the root node transferring its own self ID packet and retaining a node ID.

To achieve the second object, there is provided a virtual network controller for generating a virtual network which can be sensed by the respective nodes in the IEEE 1394 network including the root node, comprising: a storing portion, for storing as many self ID packets as virtual node IDs included in the virtual network; a main controller, for controlling the point in time at which a bus cycle generated during performing a bus initialization, a tree identification; and a self identification starts and ends; and for reading as many self ID packets as the virtual nodes stored in the storing portion during the self identification, and transferring the self ID packets to the respective nodes of the IEEE 1394 network; a digital portion, for generating a parent_notify signal required for a bus cycle of the IEEE 1394 network, including the root node and a state signal required for transferring the self ID packet, at the point in time at which the bus cycle of the main controller starts and ends during the bus initialization, the tree identification, and the self identification and for encoding the self ID packet data transferred from the main controller; and an analog portion for converting the transfer signal of the digital portion into an analog signal, converting the analog signals received from the respective nodes of the IEEE 1394 network into digital signals, and transmitting the converted signals to the digital portion.

BRIEF DESCRIPTION OF THE DRAWING(S)

The above objects and advantages of the present invention will become more apparent by describing in detail a preferred embodiment thereof with reference to the attached drawings in which.

DESCRIPTION OF THE PREFERRED EMBODIMENTS

Figure 1:
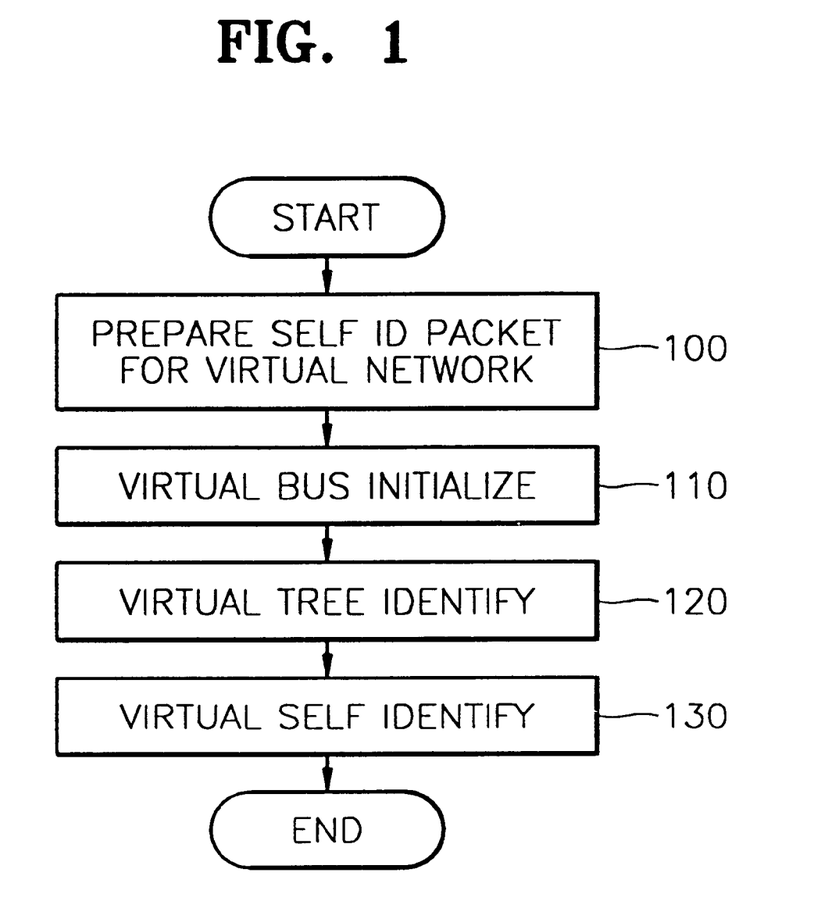
FIG. 1 is a flowchart showing processes of generating a virtual network in an IEEE 1394 network according to the present invention.

Hereinafter, a preferred embodiment of the present invention will be described with reference to the attached drawings. FIG. 1 is a flowchart showing processes of generating a virtual network in the IEEE 1394 network according to the present invention, which includes the steps of preparing a self ID packet for a virtual network (100), a virtual bus initialize (110), a virtual tree identify (120), and a virtual self identify (130).

The self ID packet for the virtual network includes virtual node ID information required for constructing the virtual network and is supplied by a virtual network controller.

In the virtual bus initializing step 110, when the virtual network controller is connected to a predetermined IEEE 1394, the respective nodes constructing the IEEE 1394 network determine whether they are a branch or a leaf node.

In the virtual tree identifying step 120, parent ports, child ports, and root nodes are determined with respect to the ports of the respective nodes. To be more specific, the controller of the virtual network and the leaf node send a parent_notify signal to the branch node and set the port of the leaf node as the parent port. When the branch node receives the parent_notify signal, the branch node transfers the child_notify signal to the virtual network controller and the leaf node, the leaf node then sets itself as the child port, and becomes a root node.

In the self identifying step 130, the virtual self ID packet is sent and physical node IDs of the respective nodes are determined. To be more specific, as many self ID packets as the virtual node IDs are repeatedly transferred through at least one virtual network controller (VNC) connected to at least one port of the root node. Then, the root node retains a node ID by transferring its own self ID packet.

Figure 2:
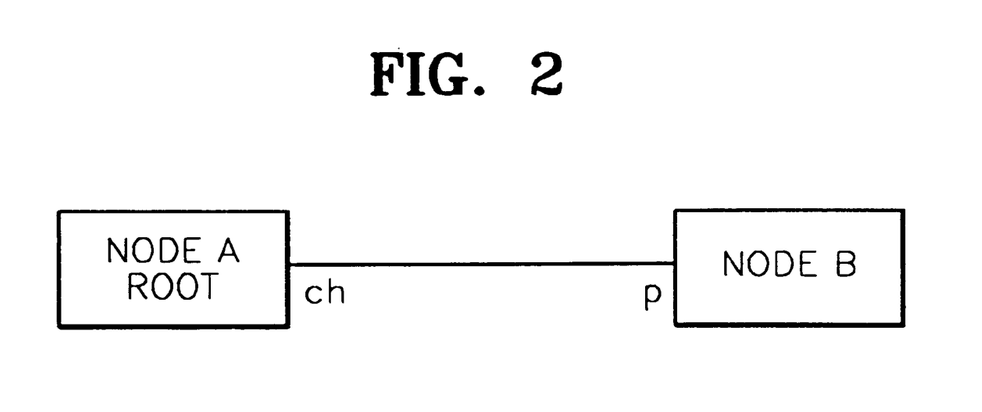
FIG. 2 shows an IEEE 1394 network comprised of two nodes (node A and node B)
Figure 3:
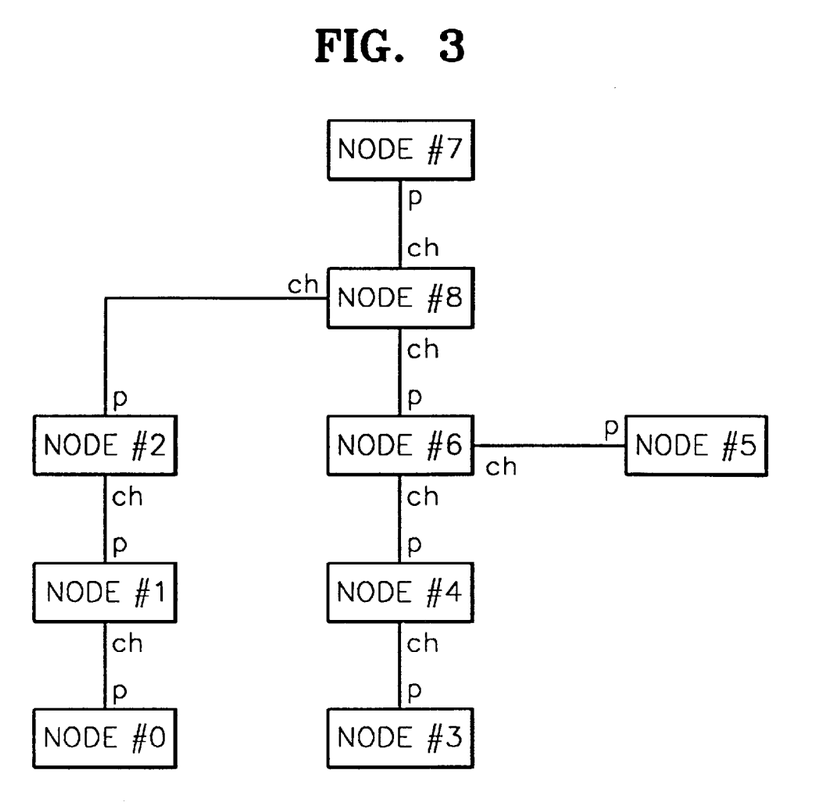
FIG. 3 shows the structure of an IEEE 1394 network comprised of nine nodes.
Figure 4:
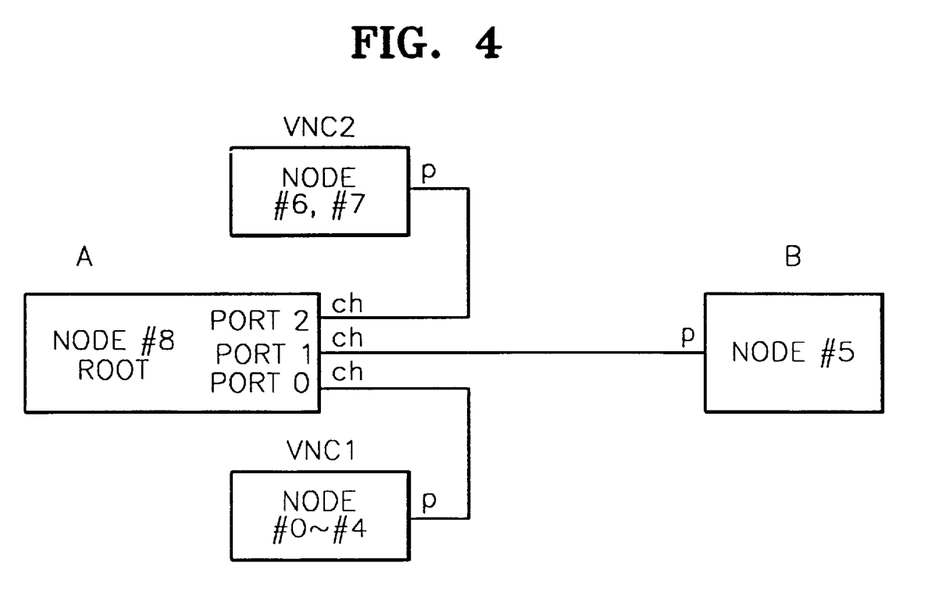
FIG. 4 shows an IEEE 1394 virtual network comprised of a virtual network controller so that a node senses the network of FIG. 3.

This will be explained by taking the generation of the IEEE 1394 network shown in FIG. 1. FIG. 2 shows an IEEE 1394 network comprised of two nodes (node A and node B). FIG. 3 shows the structure of the IEEE 1394 network comprised of nine nodes. FIG. 4 shows an IEEE 1394 virtual network comprised of a virtual network controller so that the node senses the virtual network as the network shown in FIG. 3.

The network shown in FIG. 4 is constructed so as to sense the virtual network shown in FIG. 3 in the network shown in FIG. 2. Then, the network shown in FIG. 4 operates like the network shown in FIG. 3 in an initialization process. Here, the network shown in FIG. 4 need not be completely identical to the network shown in FIG. 3. When the network shown in FIG. 4 is constructed to have as many nodes as the nodes of the network shown in FIG. 3 and the nodes have desired node IDs, the respective nodes sense the network shown in FIG. 4 to be identical to the network shown in FIG. 3.

The process of the respective nodes sensing the network shown in FIG. 4 as the network shown in FIG. 3 by generating a virtual network shown in FIG. 4 in the network shown in FIG. 2 will be described in more detail.

Since the network and ID are set in an initialization process, the initialization must be reconstructed. The initialization is performed by three processes such as a bus initialize, a tree identify, and a self identify. Before the initialization is performed it must be determined how the network is constructed. The self-ID packet for constructing the virtual network is either provided from outside the network, or constructed within itself. At this time, when a virtual network is to be constructed in the IEEE 1394 network shown in FIG. 2 by receiving already constructed specific IEEE 1394 network information, it is necessary to have a remote node (node B) retain a predetermined desired node ID and to sense as many nodes as the nodes of the already constructed network, or the network to be virtually constructed must be connected in the network to which the remote node belongs. Therefore, as shown in FIG. 4, a self-ID packet sent to remote node B from VNC1 has smaller ID values than the predetermined ID value (#5) that node B retains. A self-ID packet larger than the ID value of the B node is sent from the VNC2. The root node finally sends its own self-ID packet and has the last node ID.

1. Bus Initialize

In this process, the respective nodes determine whether they are a branch or a leaf. The physical layer chips of the respective nodes of FIG. 2 determine whether the respective nodes are a branch or a leaf. The node A can be a branch or a leaf. The node B is always a leaf. The state of two ports excluding the port connected to the node B must be 'not connected' so that the node A becomes a leaf. The virtual network controller (a controller for supporting the remote node to sense the virtual network) powers off an analog part so that the PHY (physical layer) chip senses the state of two ports as 'not connected'.

2. Tree Identify _The parent port and the child port of the respective nodes are determined. As shown in FIG. 4, The port (Port #1) connected to the node B in the PHY chip of the node A is always a child port (the node A is always the root node). The remaining two ports are able to become child ports. The two ports can be restricted to the subsequent four cases.

TABLE 1

| port #0 | port #1 | port #2 | description |
|---|---|---|---|
| not connected | remote node | not connected | node A is connected to only one node |
| child | remote node | not connected | node ID of node A is the largest and remaining nodes have IDs not more than the ID of the node A |
| not connected | remote node | child | when node B has the smallest ID value and node A has the largest ID value, remaining nodes have IDs between the two IDs |
| child | remote node | child | there are IDs smaller than that of node B and at least two IDs larger than that of node B coexist |

Figure 5:
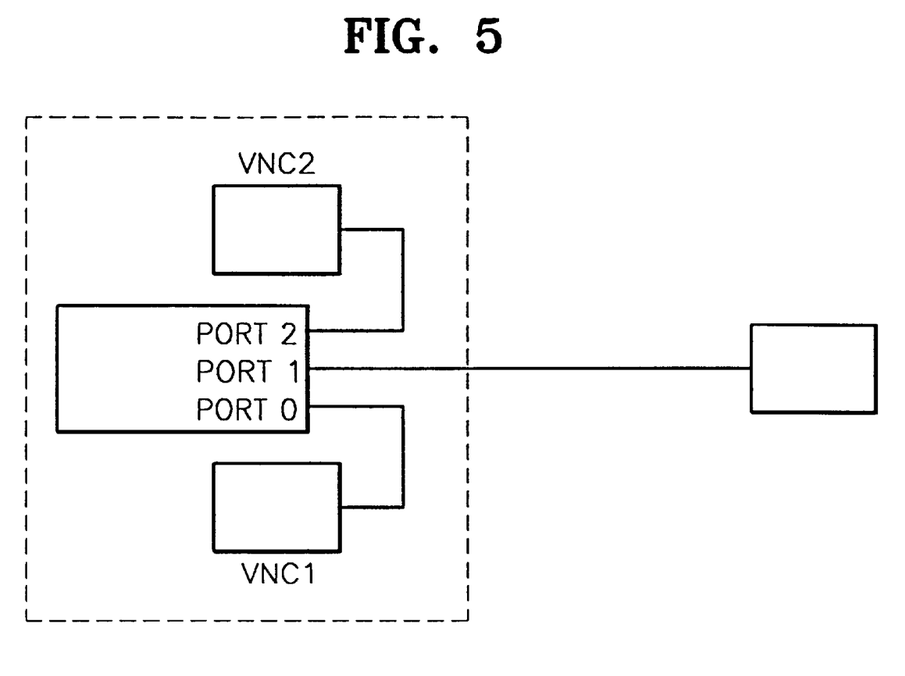
FIGS. 5 through 8 shows processes of forming a tree identification.
Figure 6:
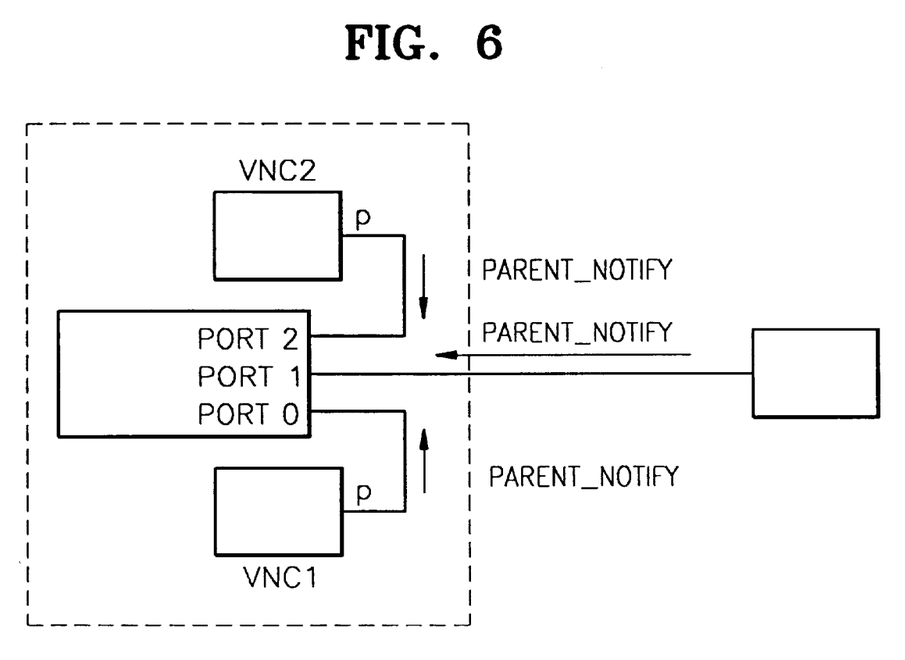
Figure 7:
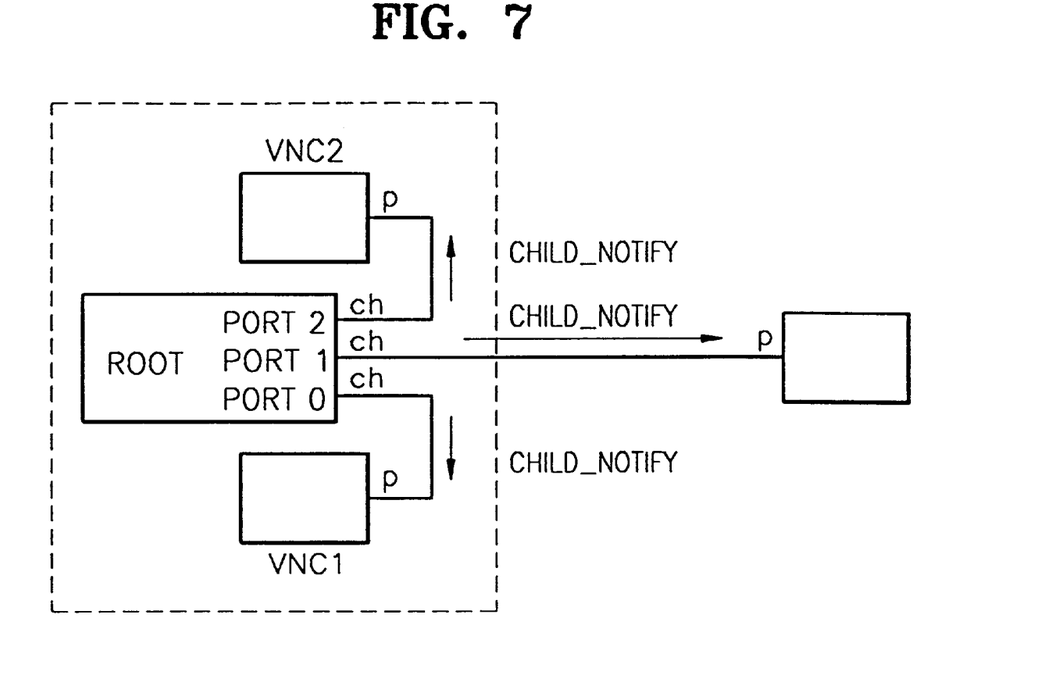
Figure 8:
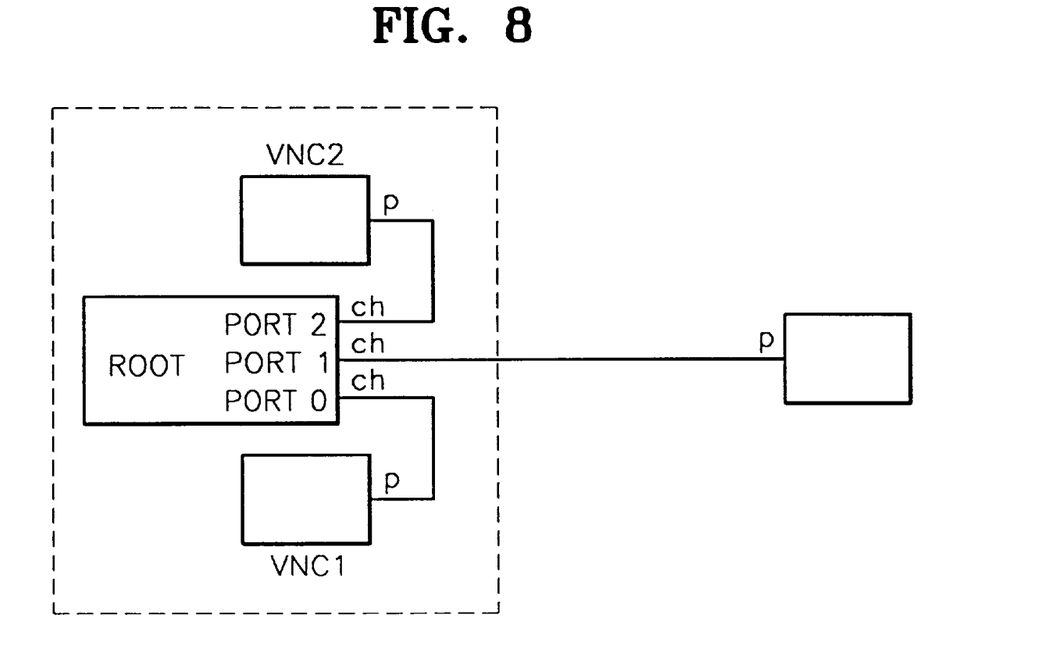

The processes of performing the tree identify will be described with reference to FIGS. 5 through 8. First, as shown in FIG. 5, VNC1 and VNC2 prepares a parent_notify signal in order to become child nodes. As shown in FIG. 6, when the leaf node, the VNC1, and the VNC2 send the parent_notify signal, the branch node receives the parent_notify signal and the leaf node, the VNC1, and the VNC2 which sent the parent_notify signal set their ports as parent nodes. As shown in FIG. 7, the branch node sends the child_notify signal to the leaf node, the VNC1, and the VNC2, sets its own port as a child port, and becomes a root. Finally, as shown in FIG. 8, the branch node always becomes a root and operates as a cycle master of the IEEE 1394 bus cycle. Thus, the tree identification is finished.

Figure 9:
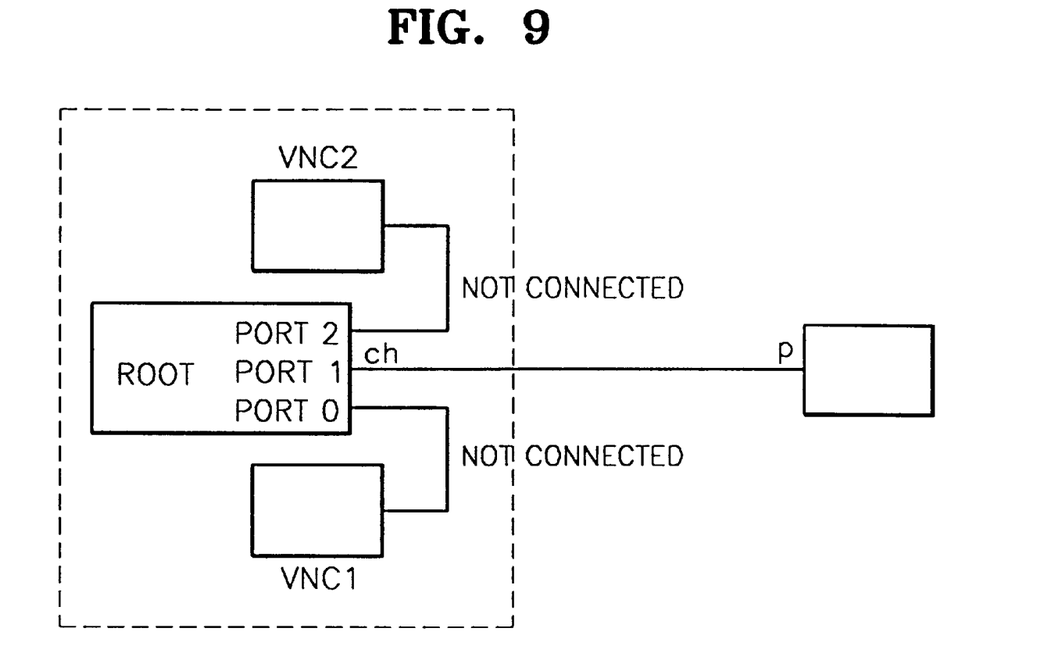
FIG. 9 shows the result of the tree identification when there are only two nodes.
Figure 10:
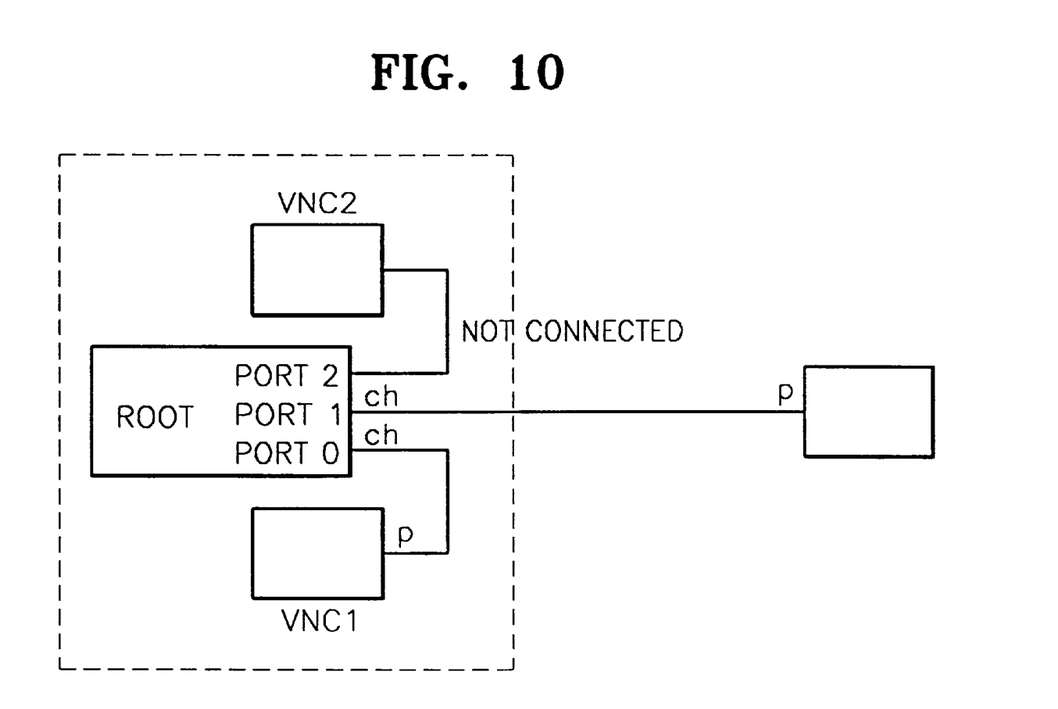
FIG. 10 shows a network in which one port is not connected and two other ports are children among three ports of a branch node.

In FIG. 9, when there are only two nodes, the state of VNC1 and the VNC2 are to be 'not connected', only one port of the branch node becomes a child, the port of the leaf node becomes a parent. FIG. 10 shows a network in which one among three ports of the branch node is 'not connected' and the two ports become child ports.

3. Self Identify

The physical IDs of the respective nodes are determined. The node B senses a virtual network when each VNC sends virtual self ID packets to the root node. The processes will be described with reference to FIGS. 11 through 24. A case in which all three PHY ports (the port 0, the port 1, and the port 2) of the node A are used will be described.

Figure 11:
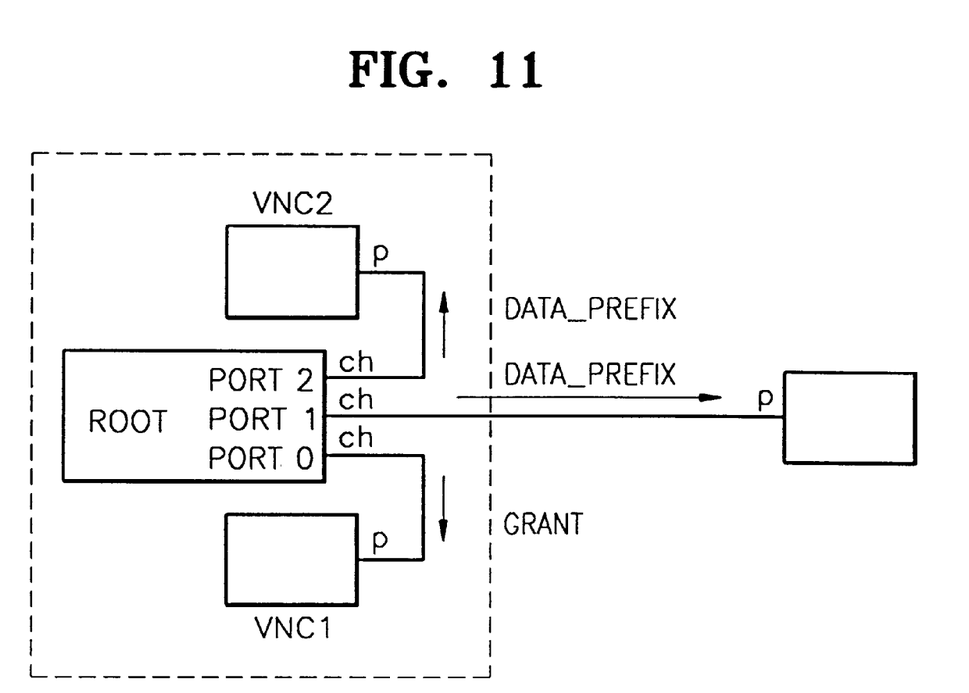
FIGS. 11 through 24 show processes of performing a self ID identification.

Since the physical chip (PHY chip) of the node A is a root as shown in FIG. 11, the PHY chip sends a grant. Here, a grant indicates that the root node is ready to receive self-ID packets from its counter node.

Figure 12:
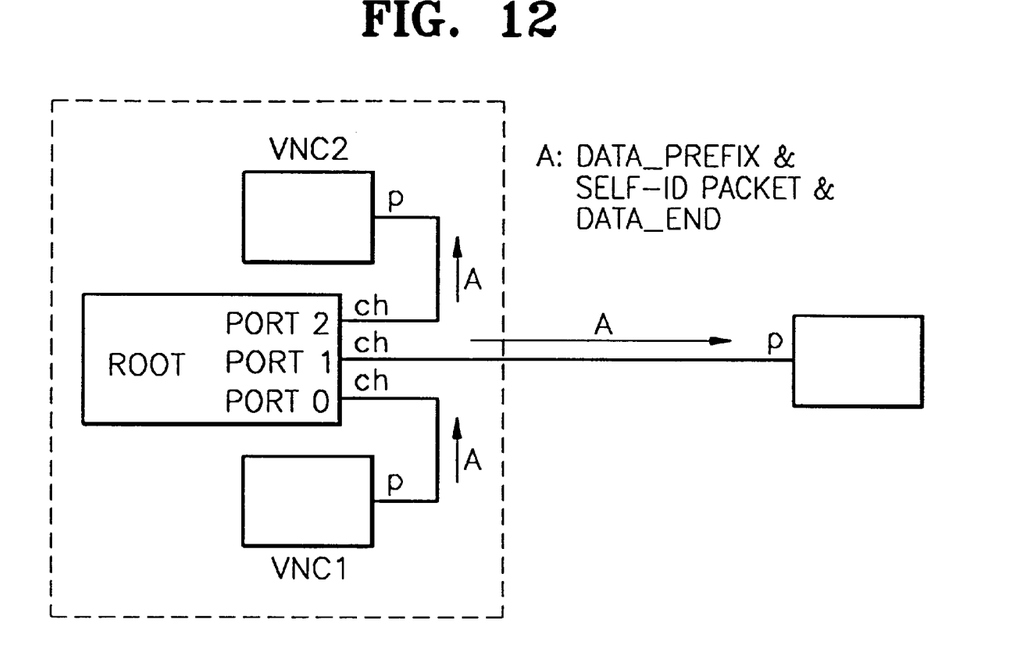
Figure 13:
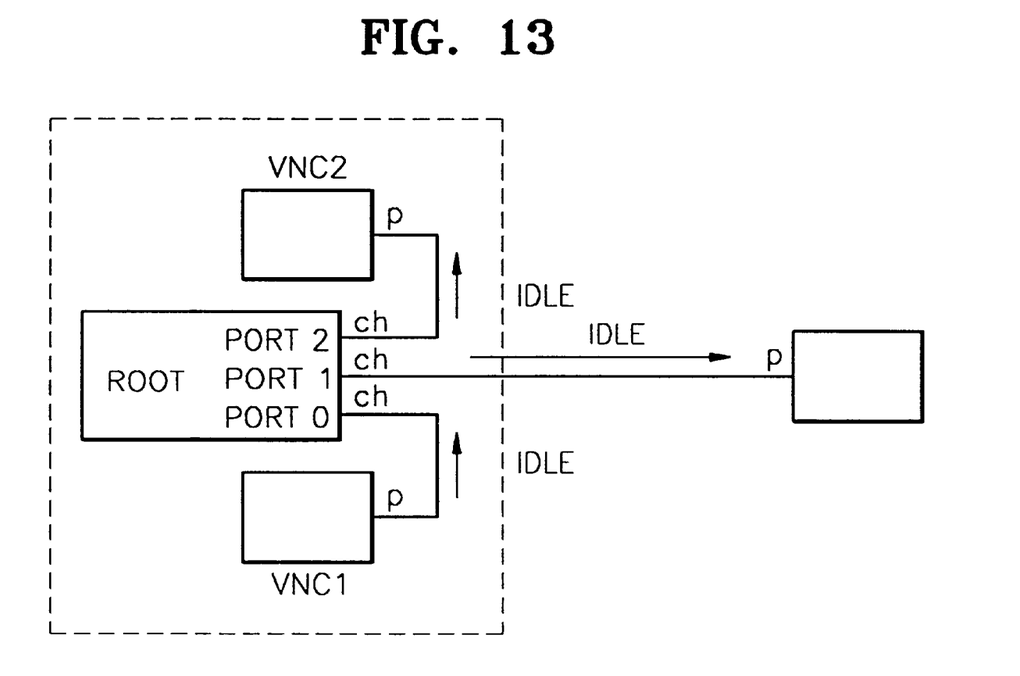
Figure 14:
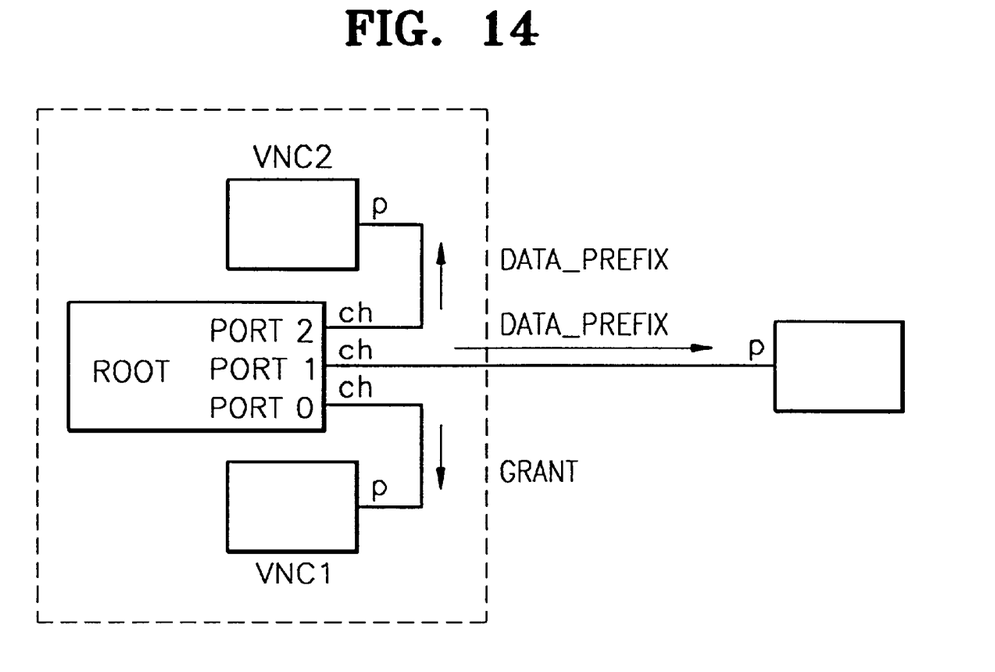
Figure 15:
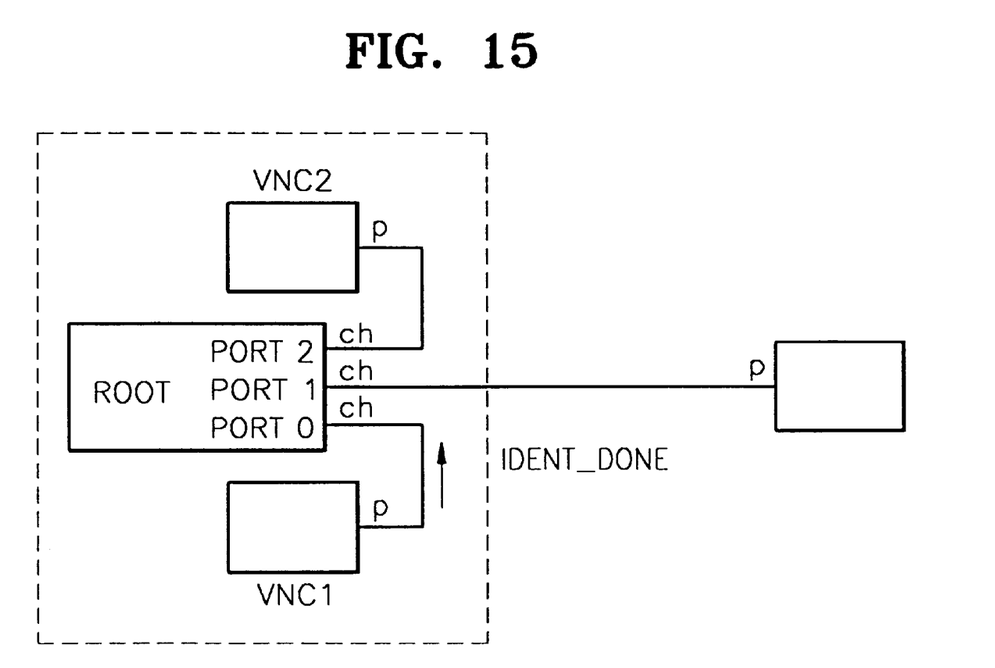
Figure 16:
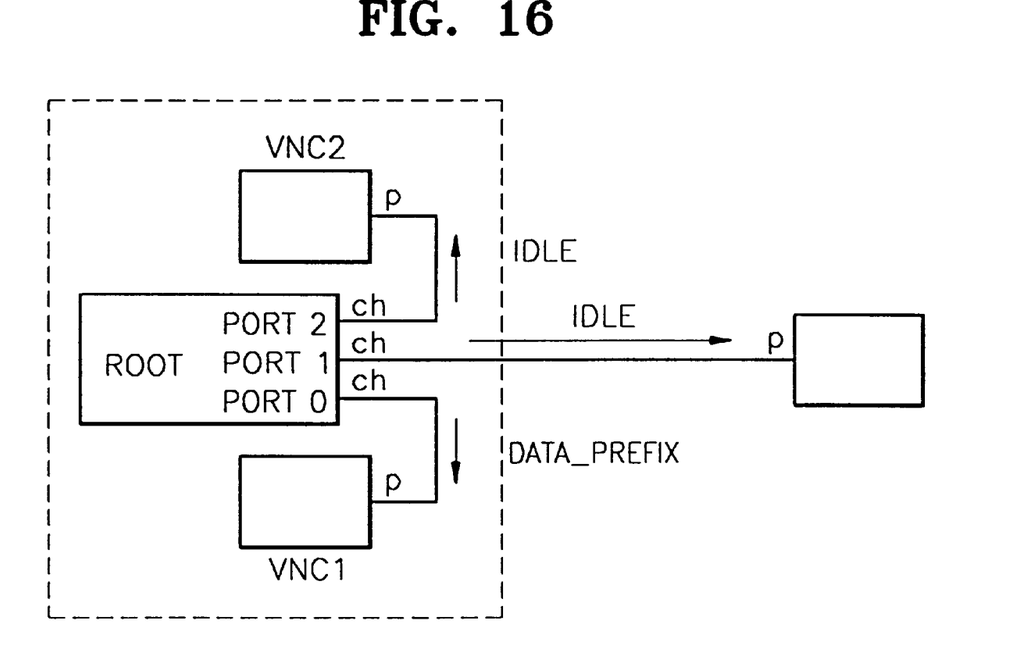

The PHY chip of the root node sends the grant to the child port (the port #0) and sends a data_prefix to the remaining child ports (ports #1 and #2). As shown in FIG. 12, the VNC1 senses the grant and sends a data_prefix, a self-ID packet, and a data_end. The data_prefix and the self-ID packet are broadcast. As shown in FIG. 13, the VNC1 becomes idle if there are more self-ID packets for virtual nodes to send. As shown in FIG. 14, the PHY chip of the root node which confirmed the idle state of VNC1 sends a grant again to the VNC1 through the port #0. The VNC 1 repeats the processes of FIGS. 12 through 14 as many times as the number of desired node IDs. As shown in FIG. 15, an ident_done is sent after sending the self-ID packets of the desired nodes 0 through 4. Then, as shown in FIG. 1B, the PHY chip of the root node responds as a data_prefix and sends an idle to the remaining ports.

The PHY chip of the root node sends the grant to the child port (the port #0) and sends a data_prefix to the remaining child ports (ports #1 and #2). As shown in FIG. 12, the VNC1 senses the grant and sends a data_prefix, a self-ID packet, and a data_end. The data_prefix and the self-ID packet are broadcast. As shown in FIG. 13, the VNC1 becomes idle if there are more self-ID packets for virtual nodes to send. As shown in FIG. 14, the PHY chip of the root node which confirmed the idle state of VNC1 sends a grant again to the VNC1 through the port #0. The VNC 1 repeats the processes of FIGS. 12 through 14 as many times as the number of desired node IDs. As shown in FIG. 15, an ident_done is sent after sending the self-ID packets of the desired nodes 0 through 4. Then, as shown in FIG. 1B, the PHY chip of the root node responds as a data_prefix and sends an idle to the remaining ports.

Figure 17:
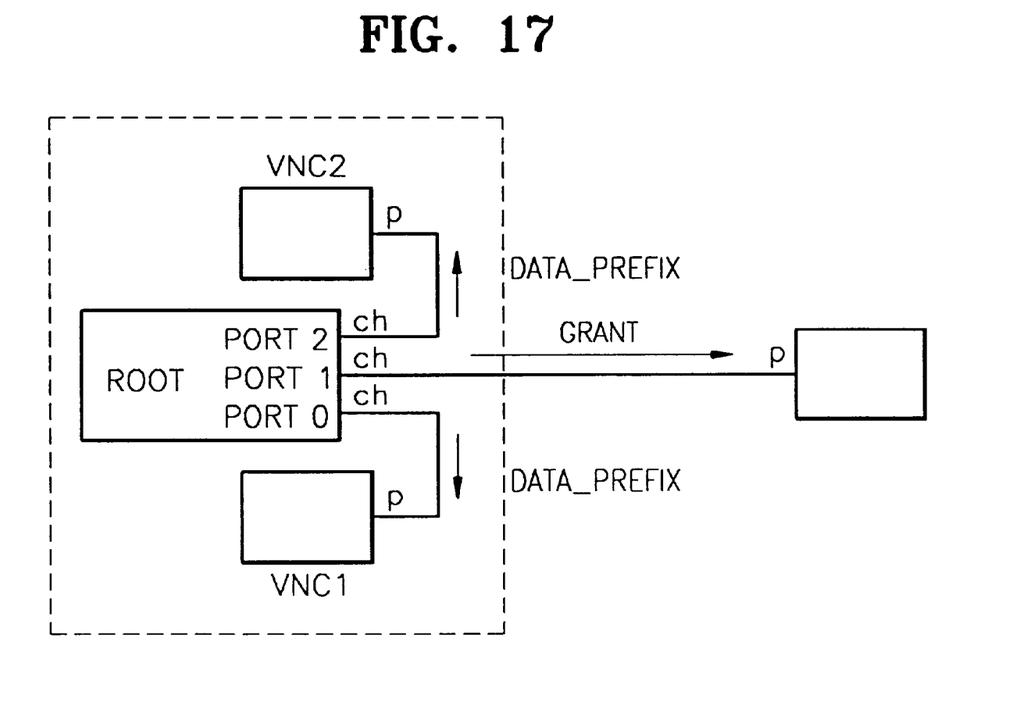
Figure 18:
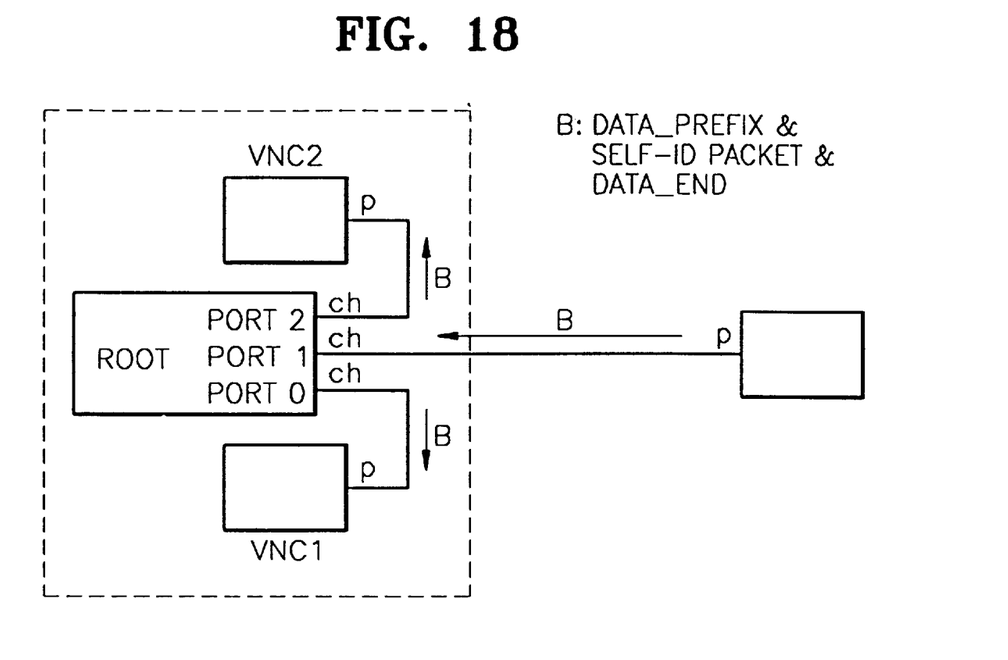
Figure 19:
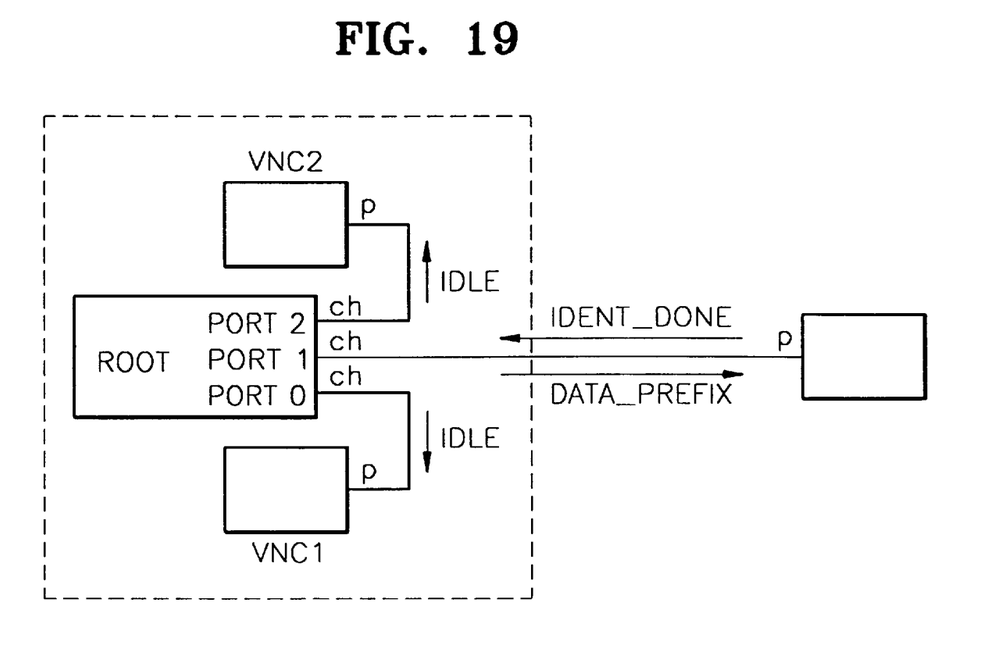
Figure 20:
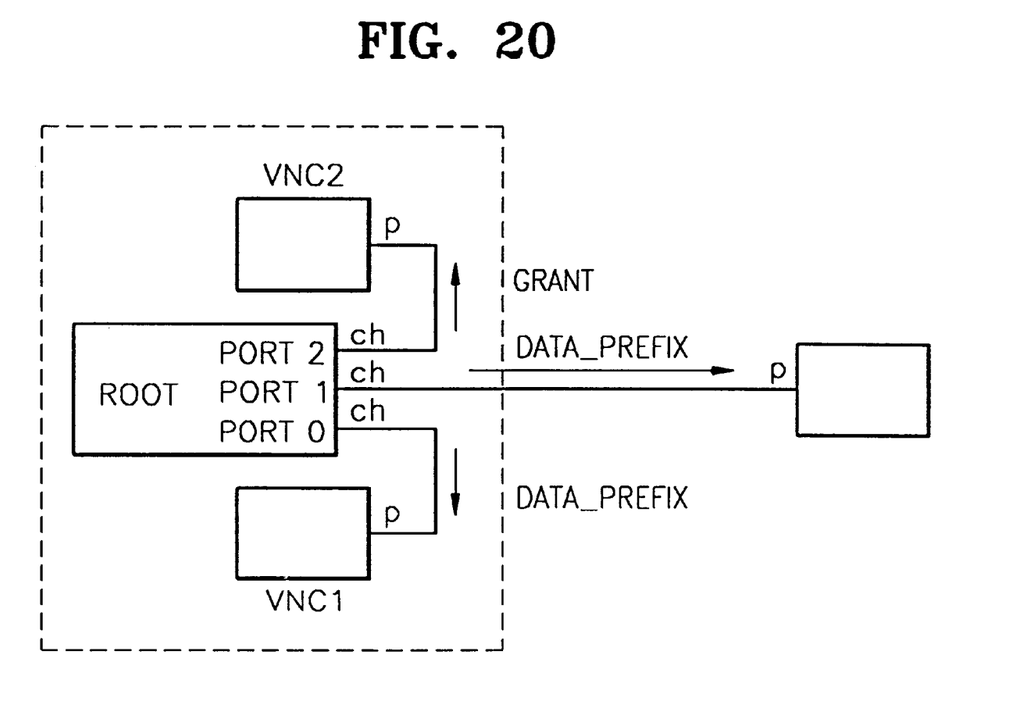

As shown in FIG. 17, the PHY chip of the root node sends a data_prefix to the ports #0 and #2 and a grant to the port #1. As shown in FIG. 18, a data_prefix, a self-ID packet, and a data_end are transferred to the root node from the remote node. As shown in FIG. 19, when the remote node sends an ident_done, the root node responds by sending data prefix and sends an idle to the remaining ports. As shown in FIG. 20, the PHY chip of the root node receives the idle from the remote node and sends a data_prefix through the ports #0 and #1 and a grant to the VNC2 through the port #2.

Figure 21:
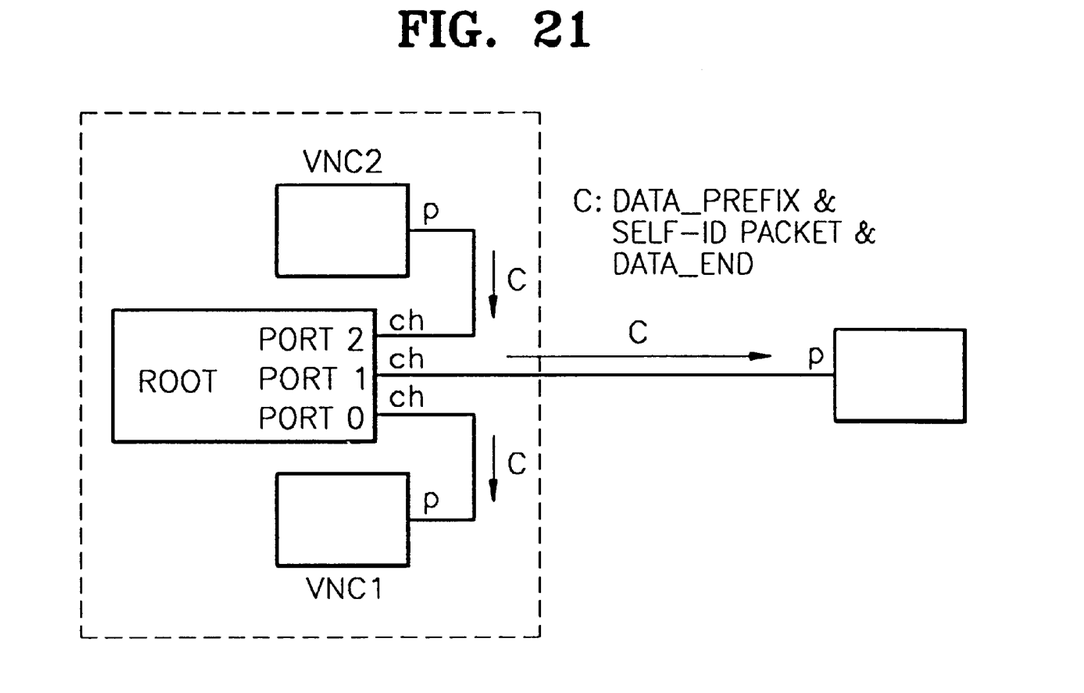
Figure 22:
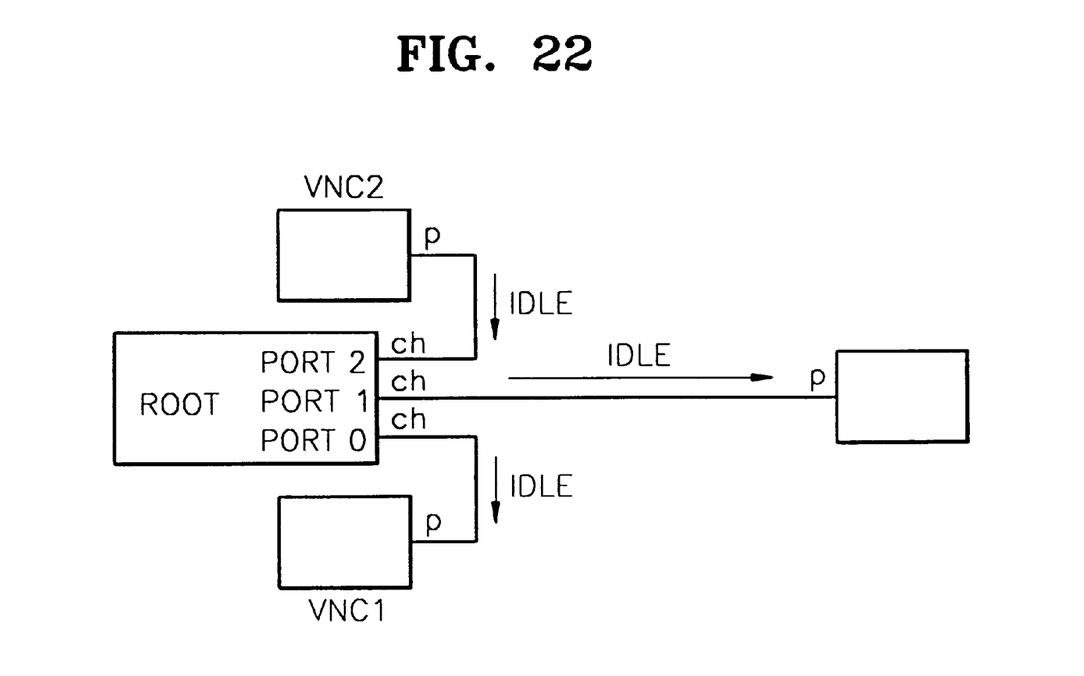
Figure 23:
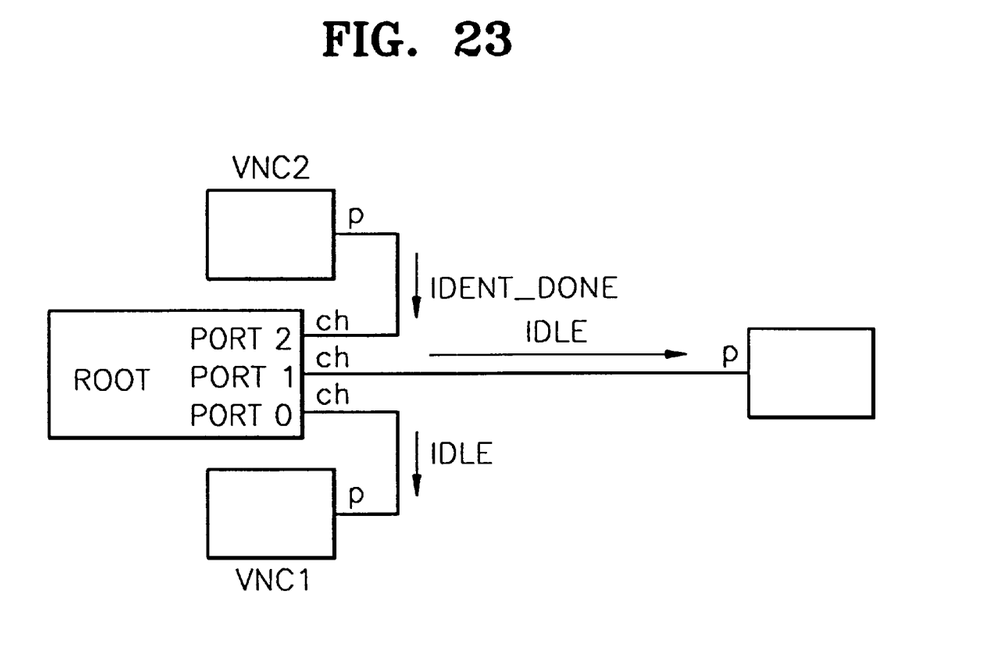
Figure 24:
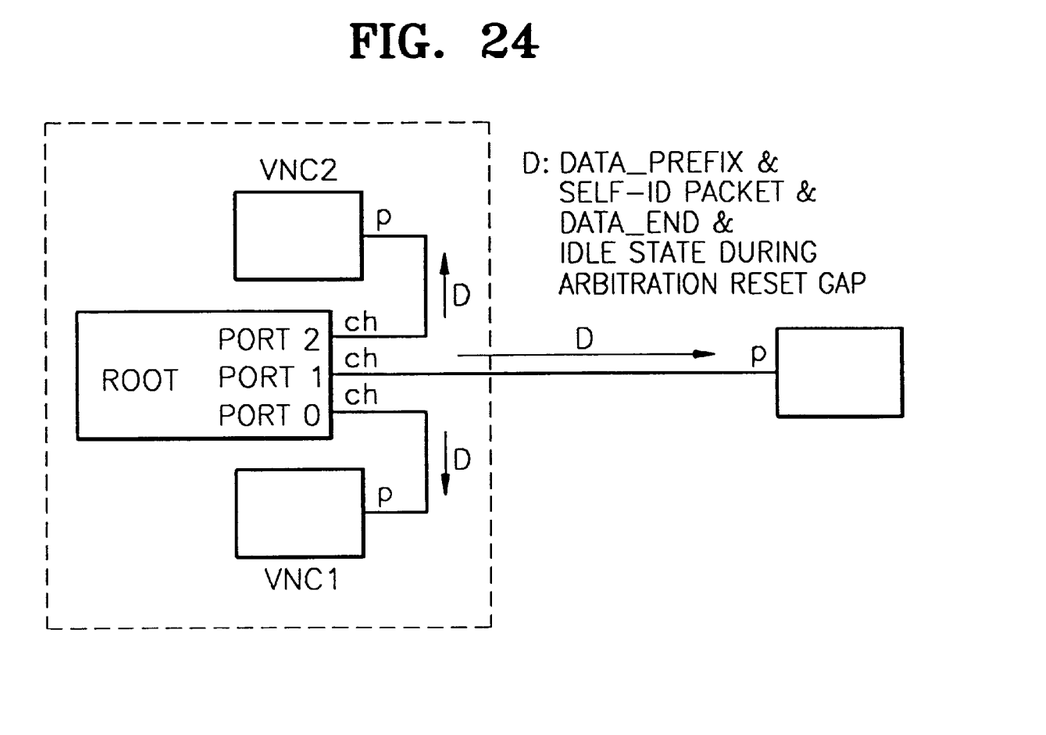

When the VNC2 receives the grant, the VNC2 performs the processes of FIG. 21 and FIG. 22, and repeats the processes from FIG. 20 to FIG. 22 as many times as the number of desired IDs. The VNC2 sends as many data_prefixs, self-ID packets, and data_ends as the required nodes and then, as shown in FIG. 23, sends an ident_done to the port #2. As shown in FIG. 24, the PHY chip of the root node transfers the final self-ID packet through each port as the root. Then, the PHY chip sends an idle to the child ports. The idle state is maintained by an arbitration reset gap.

In order to construct the IEEE 1394 basic network shown in FIG. 2 as shown in FIG. 4, thus to set the same number of nodes as the network shown in FIG. 3 and an arbitrary ID, the tree identification is performed through the processes from FIG. 5 to FIG. 9 and the processes from FIG. 11 to FIG. 24 are performed. Then, the node IDs of all the nodes are determined. Finally, the virtual network is completed. In the above network, the node B senses that the same number of nodes are connected as in the network of FIG. 3 and has a specific node ID.

Figure 25:
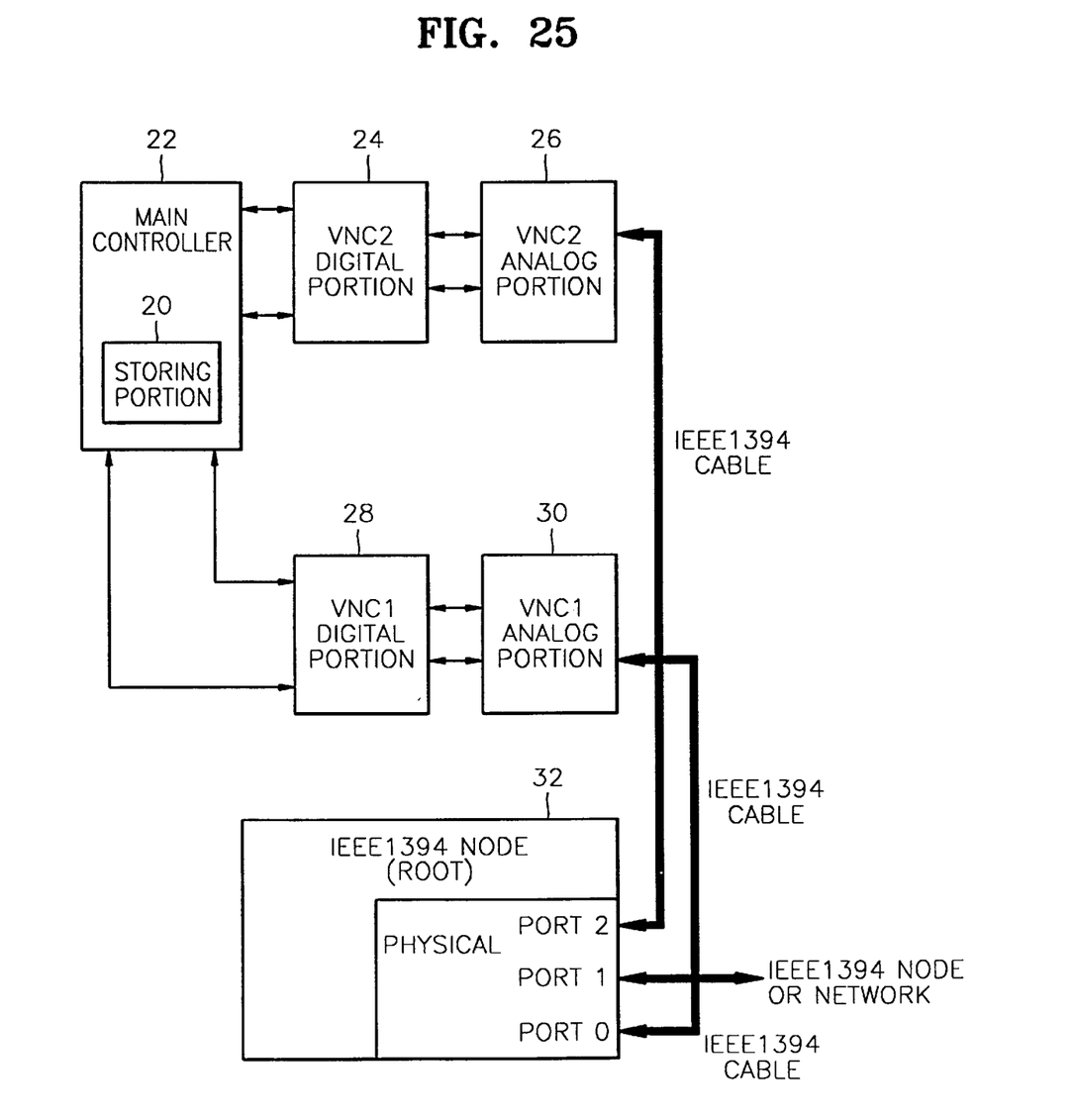
FIG. 25 is a block diagram showing the structure of a virtual network controller for generating a virtual network which can be sensed by the respective nodes in the IEEE 1394 network including a root node and at least one node according to the present invention.

FIG. 25 is a block diagram showing the structure of a virtual network controller for generating a virtual network which can be sensed by the respective nodes in the IEEE 1394 network including the root node according to the present invention and at least one node. The virtual network controller includes a storing portion 20, a main controller 22, digital portions 24 and 28, and analog portions 26 and 30.

The storing portion 20 located in the main controller stores as many self ID packets as the number of the virtual node IDs included in the virtual network.

The main controller 22 controls timing at which a bus cycle generated for the bus initialization, the tree identification, the self ID identification, and for generating the virtual network, starts and ends. The main controller 22 reads as many self ID packets as virtual nodes stored in the storing portion 20 during the self ID identification from the storing portion 20 and transfers the self ID packets to the respective nodes of the IEEE 1394 network including the root node 32.

The digital portions 24 and 28 generate the state required for transferring the parent_notify signal and the self ID packet required for the bus cycle of the IEEE 1394 network including the root node 32 adjusting the point in time at which the bus cycle of the main controller 22 starts and ends during the bus initialization, the tree identification, and the self ID identification. The packet data transferred from the main controller 22 is encoded.

The analog portions 26 and 30 convert the transfer signals of the digital portions 24 and 28 into analog signals, convert the analog signals received from the respective nodes of the IEEE 1394 network into digital signals, and transmit the converted signals to the digital portions 24 and 28. The analog portions 26 and 30 are different from an IEEE 1394–1995 standard only in that Data_Rx, Sppd_Rx, and Strb_Rx functions are missing. Since the initialization is always performed at a minimum speed, a speed check is not necessary. Since the packet information need not be used, the Rx portion of the data and the strobe are not necessary.

According to the present invention, it is possible to arbitrarily set a node ID on a network. It is also possible to physically sense and operate a virtual network, so that when different IEEE 1394 networks (in which initializations independently occur) are connected by a certain medium, the respective nodes sense the IEEE 1394 networks are in the same network.

While preferred embodiments of the present invention have been described using specific terms, such description is for illustrative purposes only, and it is understood that changes and variations may be made by one skilled in the art without deviating from the broad principles and teachings of the present invention which shall be limited solely by the scope of the claims appended hereto.

What is claimed is:

1. A method for establishing an IEEE 1394 virtual network, comprising the steps of:

connecting a virtual network controller to a first node of a predetermined IEEE 1394 network, wherein the virtual network controller generates a virtual self ID packet including virtual node ID information required for constructing the IEEE 1394 virtual network, and the virtual network controller determines whether respective nodes of the virtual network are branches or leaves by performing virtual bus initialization;

determining parent ports and child ports with respect to ports of the respective nodes and a root node by performing a virtual tree identification which establishes the first node as the root node;

determining physical node IDs of the respective nodes by sending the prepared virtual self ID packet;

wherein said virtual tree identification step comprises the steps of:

setting a port of a leaf node as a parent node by the virtual network controller and the leaf node sending a parent_notify signal to a branch node; and the branch node transferring a child_notify signal to the virtual network controller and the leaf node, then setting itself as a child port and becoming the root node when the branch node receives the parent_notify signal.

2. A method for establishing an IEEE 1394 virtual network, comprising the steps of:

connecting a virtual network controller to a first node of a predetermined IEEE 1394 network, wherein the virtual network controller generates a virtual self ID packet including virtual node ID information required for constructing the IEEE 1394 virtual network, and the virtual network controller determines whether respective nodes of the virtual network are branches or leaves by performing virtual bus initialization;

determining parent ports and child ports with respect to ports of the respective nodes and a root node by performing a virtual tree identification which establishes the first node as the root node;

determining physical node IDs of the respective nodes by sending the prepared virtual self ID packet, wherein the step of determining the physical node ID comprises the steps of:

repeating and transferring as many self ID packets as virtual node IDs through said virtual network controller (VNC) connected to establishing a virtual network which can be sensed by respective nodes in a IEEE 1394 network including a root node, comprising:

a storing portion, for storing as many self ID packets as virtual node IDs included in the virtual network;

a main controller, for controlling a first time at which a bus cycle, generated during performing a bus initialization, a tree identification, and a self identification, starts and ends, and for reading as many self ID packets as there are virtual IDs stored in the storing portion during the self identification and transferring the self ID packets to the respective nodes of the IEEE 1394 network;

a digital portion, for generating a parent_notify signal required for the bus cycle of the IEEE 1394 network, including the root node, and a state signal required for transferring the self ID packet, at a second time at which the bus cycle of the main controller starts and ends during the bus initialization, the tree identification, and the self identification and for encoding the self ID packet data transferred from the main controller; and an analog portion, for converting the parent_notify signal and the encoded self ID packet into analog signals, and for converting analog signals received from the respective nodes of the IEEE 1394 network into digital signals, and transmitting the digital signals to the digital portion.

3. A virtual network controller for establishing a virtual network which can be sensed by respective nodes in a IEEE 1394 network including a root node, comprising:

a storing portion, for storing as many self ID packets as virtual node IDs included in the virtual network;

a main controller, for controlling a first time at which a bus cycle, generated during performing a bus initialization, a tree identification, and a self identification, starts and ends, and for reading as many self ID packets as there are virtual IDs stored in the storing portion during the self identification and transferring the self ID packets to the respective nodes of the IEEE 1394 network;

a digital portion, for generating a parent_notify signal required for the bus cycle of the IEEE 1394 network, including the root node, and a state signal required for transferring the self ID packet, at a second time at which the bus cycle of the main controller starts and ends during the bus initialization, the tree identification, and the self identification and for encoding the self ID packet data transferred from the main controller; and an analog portion, for converting the parent notify signal and the encoded self ID packet into analog signals, and for converting analog signals received from the respective nodes of the IEEE 1394 network into digital signals, and transmitting the digital signals to the digital portion;

wherein the main controller controls the tree identification by setting a port of a leaf node as a parent node and controls the leaf node to send a parent_notify signal to a branch node; and controls the branch node transferring a child_notify signal to the leaf node, then setting itself as a child port and becoming the root node when the branch node receives the parent_notify signal.

* * * * *